Oct. 11, 1949.    H. E. CRINER ET AL    2,484,207
GAS DENSITY METER

Filed Feb. 16, 1945    2 Sheets-Sheet 1

INVENTORS
Harry E. Criner and
René A. Baudry.
BY O. B. Buchanan
ATTORNEY

Oct. 11, 1949.          H. E. CRINER ET AL                    2,484,207
                          GAS DENSITY METER
Filed Feb. 16, 1945                                 2 Sheets-Sheet 2
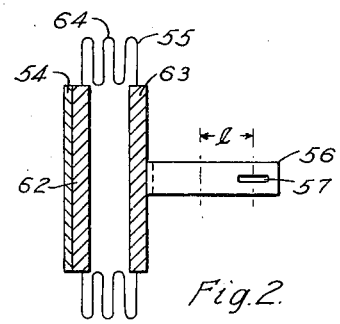
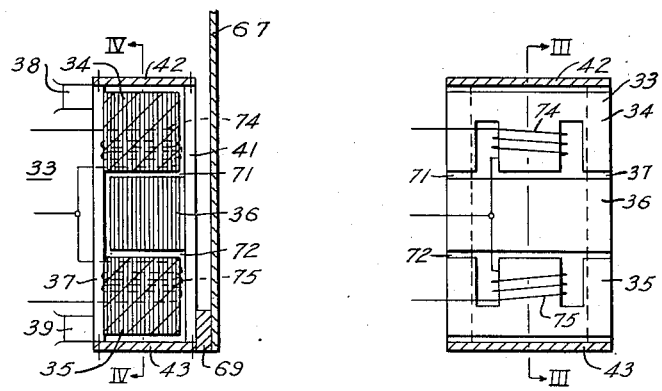
WITNESSES:
INVENTORS
Harry E. Criner and
René A. Baudry.
BY
ATTORNEY Patented Oct. 11, 1949

2,484,207

UNITED STATES PATENT OFFICE 2,484,207

GAS DENSITY METER

Harry E. Criner, Forest Hills, and René A. Baudry, Wilkinsburg, Pa., assignors to Westinghouse Electric Corporation, East Pittsburgh, Pa., a corporation of Pennsylvania Application February 16, 1945, Serial No. 578,330

5 Claims. (Cl. 73—30)

Our invention relates to a novel type of density-meter which is of the remote-indicating type, giving a direct reading of the density of a gas, automatically corrected or compensated for both pressure and temperature. It was primarily designed for measuring the hydrogen-concentration in the hydrogen-air mixtures of hydrogen-cooled turbogenerators, but its general principles are susceptible of measuring the purity of any gas, or, in general, of measuring the density of any gas, whatever its temperature or pressure, compensated for any standard temperature and pressure.

An object of our invention is to utilize a blower-device for producing a gaseous pressure which is a function of the gas-density, the absolute pressure and the absolute temperature of the gas to be measured, and to utilize a frictionless piston, operating against a spring, for translating that pressure into displacement, and to utilize a reluctance-gauge and a suitably calibrated milliammeter to translate that displacement into electric currents and meter-responses or other current-indications or responses. A reluctant-gauge is a Wheatstone-bridge measuring-instrument, two legs of which consist of coils which are disposed on two opposite E-shaped cores having a movable armature between them. The movable armature moves toward one core as it moves away from the other, thus detecting small movements or displacements of the core by converting such displacements into differences between the reluctances of the magnetic paths of the two coils of the Wheatstone bridge. The milliammeter, in this case, can be calibrated directly in percentages of hydrogen-purity, or percentages in the gas-purity of whatever gas the meter is to be calibrated for, or it may be calibrated in any other units of gas-density.

In the preferred form of embodiment of our invention, the density-measuring instrument of the type just described is compensated for the absolute pressure of the gas and the absolute temperature of the gas, by utilizing a linkage for applying the piston-displacement to the movable armature of the reluctance-gauge in such a manner that the length of one leg of the linkage is responsive to temperature and pressure in a manner which is inverse with respect to the response of the blower-pressure to temperature and pressure. A suitable form of such compensating link is provided by a bellows, containing a fixed quantity of gas, and having a displaceable end, the displacement of which is linearly responsive to the volume of the gas entrapped in the bellows, and hence directly responsive to the absolute temperature and inversely responsive to the pressure of the ambient gaseous medium in which the bellows is located. If such a bellows is placed within the gas to be measured, the volume of the gas within the bellows is responsive to the quotient of the absolute temperature divided by the absolute pressure of the gas to be measured, because that temperature and that pressure are communicated from the gas to be measured to the gas within the bellows.

A further object of our invention is to provide a density-meter of the class described, with facilities and arrangements for conveniently calibrating the same in air, so that it can be utilized in hydrogen or in gases of density other than that of air.

A preferred form of embodiment of our invention is illustrated in the accompanying drawing, wherein Figure 1 is a somewhat diagrammatic cross-sectional view of apparatus embodying our invention, Fig. 2 is a detail cross-sectional view of the compensating bellows, on the section-plane indicated by the line II—II in Fig. 1.

Fig. 3 is a sectional view of the reluctance gauge, as would be seen by breaking away some of the parts from Fig. 1, with the coils of the reluctance-gauge indicated diagrammatically. The section-plane of Fig. 3 is indicated at III—III in Fig. 4.

Fig. 4 is a diagrammatic sectional view of the reluctance-gauge, on the plane indicated at IV—IV in Fig. 3.

Figure 1:
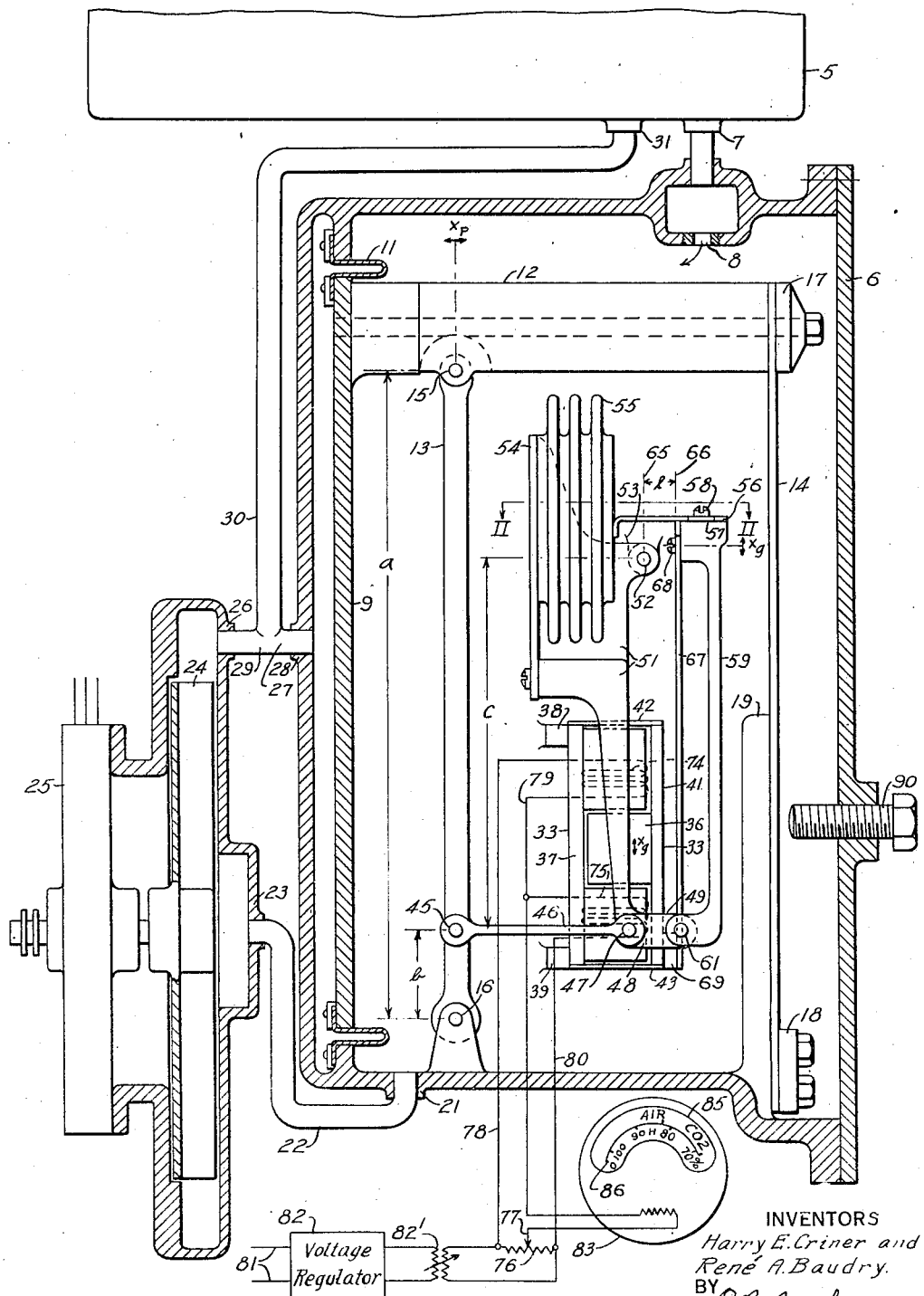

Referring to Figure 1, the gas to be measured is contained in a gas-filled vessel 5, which may be the casing of a hydrogen-cooled generator (not shown), or the smoke-stack of a furnace (not shown), or any other gas-filled space for which it is desired to determine the percentage of the volume of the hydrogen-content to the volume of the mixture of hydrogen and air, as in the case of a hydrogen-cooled generator; or to determine the percentage of the carbon-dioxide content of flue gases; or, in general, to determine the relative density of any gas, preferably automatically compensated for temperature and pressure.

Our density-gauge comprises a suitable type of gas-pressure gauge, which is illustrated as comprising an enclosed gas-tight chamber 6, which receives gas from the gas-chamber 5 under test, through a pipe or other gas-opening or connection 7, and preferably also through a reduced-flow orifice 8, which can be chosen to limit the velocity of gas-flow in a manner which will subsequently be described.

One end of our gas-gauge chamber 6 is partitioned off by a piston 9, the edges of which are sealed with a flexible bellows-like sealing-member 11, so that no gas can pass from one side of the piston to the other, within the chamber 6. We use the term "piston" to refer to any movable pressure-responsive gauge-element, rigid or non-rigid. In our illustrated form of embodiment of our invention, we have shown the piston 9 as a rigid disk-like member, carrying a rigid piston-arm 12, preferably not centrally disposed but disposed near one edge of the piston 9, and extending back from it for a considerable distance, at right angles to the piston, said arm 12 being contained altogether within the casing 6.

The piston-arm 12 is mounted to have a small amount of substantially rectilinear motion by means of a parallel linkage 13 and 14. The front link 13, or the link closest to the piston 9, is pivoted at 15 to the piston-arm 12, at the top of the link 13, while the bottom of the link 13 is pivotally supported at 16 on the bottom of the housing 6. The pivotal supports 15 and 16 are preferably frictionless pivots of a known kind, and the pivot-representations in the drawing are intended only as a diagrammatic representation of any suitable pivots.

The rear link 14 of the parallel linkage 13–14 which supports the piston-arm 12 is in the form of one or more leaf-springs 14, the top of which is clamped, at 17, to the piston-arm 12, while the bottom of the piston-spring 14 is clamped, at 18, to the bottom of the housing 6. The piston-spring 14 is biased to press the piston 9 forwardly, or away from the spring, until the spring 14 moves up into contact with a fixed arm or shelf 19 extending up from the bottom of the housing 6.

The gas is drawn out of the chamber or housing 6 through an outlet 21, which is suitably connected, as by piping 22, to the inlet end 23 of a centrifugal blower 24, which is driven by a constant-speed motor 25, preferably in the form of a synchronous polyphase motor. The blower-outlet 26 is suitably connected, as by piping 27, to a high-pressure inlet 28 on the piston side of the chamber 6, so that the pressure-difference between the high-pressure side 26 and the low-pressure side 23 of the blower is impressed on opposite sides of the piston 9, so as to press the piston backwardly against the restraint of its spring 14. The high-pressure outlet 26 of the blower is also connected, through a T-connection 29 and a pipe 30, to an inlet-opening 31 in the gas-chamber 5 containing the gas to be sampled.

In this manner, the blower 24 continuously draws air through the pipe 7, and through the density-gauge chamber 6, and returns it back to the original gas-container 5, impressing, across the piston 9 of the gauge, whatever pressure-difference is produced by the rotation of the blower 24 in the sampled gas. The restricted inlet-opening 8 is preferably adjusted so that only a relatively small quantity of gas is permitted to pass, the gas-flow being throttled down so that the blower 24 operates on the upper or constant portion of its pressure-volume curve, so that the differential pressure produced by the blower is independent of the rate of gas-flow through the blower.

The displacement of the piston 9, as a result of the pressure-difference operating against the restraint of the spring 14, is applied, by a suitable linkage, subsequently described, to a reluctance-gauge 33, which is shown more in detail in Figs. 3 and 4. The reluctance-gauge consists essentially of two oppositely disposed E-shaped laminated cores 34 and 35, separated by a large airgap which is nearly filled with a movable laminated armature 36. The two E-shaped cores 34 and 35 are mounted upon a base-plate or plates 37, which are supported on bosses 38 and 39 carried by the housing 6. The movable armature 36 is carried by a front-plate or plates 41, the ends of which are mounted upon two springs 42 and 43, the other ends of the springs being connected to the base-plate or plates 37. In this manner, the two springs 42 and 43 serve as a parallel linkage for permitting the front-plate 41, and hence the armature 36, to have a substantially frictionless rectilinear motion, so that the armature 36 may approach toward the one or the other of the two E-shaped cores 34 and 35.

We show a double reduction-linkage for transferring the piston-movement $x_p$ to the reluctance-gauge 33, to produce the gauge-movement $x_g$ of the gauge-armature 36. In the particular form of linkage which we have shown, the front link 13, which supports the piston-arm 12, is provided with an intermediate pivot-point 45 which has a motion $b/a$ times the motion of the motion $x_p$ of the piston 9, where $b$ is the length of the short arm 16—45, while $a$ is the length of the long arm 15—15, or the total length of the link 13.

The pivot-point 45 is connected, by means of a link 46, to a second pivot-point 47 which is carried by the bottom of a second linkage-member 48. The linkage-member 48 has a short bottom piece 49, and a rigid upstanding portion 51 which is pivoted, near its top, at 52, to a boss 53 carried by the casing 6.

An upwardly extending portion 54 of the vertical arm 51 of the linkage 48 serves as a mounting-base for the back end of a gas-tight hermetically sealed bellows 55, or other barometric means, the front end of which carries a forwardly extending link 56, which is provided with a slot 57 for an adjustable connection 58 with the top end of a linkage or rigid portion 59 of the second linkage 48. The bottom end of the member 59 is pivoted or otherwise connected to the bottom portion 49 of the linkage 48, by a connection which is shown at 61.

The construction of the bellows 55 is indicated schematically in Fig. 2. The essential features of the bellows-design is that it has a stiff flat base or rear-plate 62, a stiff flat front-plate 63, and flexible bellows-like side-walls 64, so arranged that the separation between the two plates 62 and 63, as the fixed quantity of gas which is entrapped in the bellows expands and contracts under differences of temperature and pressure, will be exactly proportional to the volume of the entrapped gas, and hence proportional to the quotient of its absolute temperature divided by its pressure.

As shown in Fig. 1, the forwardly extending arm 56 of the bellows 55 provides, in effect, a rigid bell-crank arm $l$, of adjustable length, the $l$ being the distance between the vertical plane 65 passing through the fixed pivot 52 of the linkage-member 51, and the vertical plane 66 of a vertical link 67, the top end of which is secured, at 68, to the top of the member 59, and thence to the arm 56, while the bottom of the linkage 67 is connected to a block 69 carried by the armature-plate 41 of the reluctance-gauge 33. The length of the long bell-crank arm 51 is the vertical distance between the fixed pivot 52 at the top and the linkage-pivot 47 at the bottom, so that this arm 52—47 constitutes the long arm of a bell crank, having a length c, while the distance $l$ of the bellows-arm 56 constitutes the short arm of the bell crank. The short bell-crank arm $l$ is of a length determined by the separation between the front and back plates 62 and 63 of the bellows 55, and this distance $l$ is such that it would be zero at the absolute zero of temperature or at infinite pressure, or when the bellows 55 is totally collapsed.

From the linkage a, b and the bell-crank c, l, it is easy to express the relationship between the gauge-displacement $x_g$ and the piston-displacement $x_p$, as shown by the formula:

$$x_g = x_p \cdot \frac{bl}{ac} \quad (1)$$

The piston-displacement $x_p$ is directly proportional to the pressure-difference which is produced by the blower 24, and this pressure-difference of the blower is inversely proportional to the absolute temperature T of the gas, and directly proportional to the absolute gas-pressure P and a function of the gas-density or of the gas-purity, which we may write $f(V_h/V_m)$, where $V_h$ and $V_m$ are respectively the volume of the hydrogen-content of the mixture and the total volume of the mixture of the hydrogen and air which is contained in the hydrogen-filled vessel 5. The piston-displacement $x_p$ may thus be written:

$$x_p = f\left(\frac{V_h}{V_m}\right) \cdot \frac{P}{T} \quad (2)$$

The length of the short bell-crank arm $l$ is equal to a constant $k$ times the temperature T, divided by the pressure P. Thus $$l = k\frac{T}{P} \quad (3)$$

Substituting Equations 2 and 3 in Equation 1, it will be observed that the gas-temperature T and the gas-pressure P cancel out, leaving a gauge-displacement $x_g$ which is proportional to a constant $kb/ac$ times the function $f(V_h/V_m)$ of the gas-purity, or $$x_g = f\left(\frac{V_h}{V_m}\right) \cdot \frac{kb}{ac} \quad (4)$$

Equation 4 shows that the displacement $x_g$, or the amount of upward or downward movement of the armature 36 of the reluctance-gauge 33, is linearly responsive to the same function of the gas-purity ratio $V_h/V_m$ to which the blower 24 responds, in building up its blower-pressure or gas-pressure-difference. If the blower 24 is of the centrifugal type, with the gas-flow throttled as at 8, the pressure-difference created by the blower 24 is of the type expressed by a constant times $f(V_h/V_m)$, where $$f\left(\frac{V_h}{V_m}\right) = k_1 - k_2 \frac{V_h}{V_m} \quad (5)$$

where $k_1$ and $k_2$ are constants. This is a straight-line response.

The gauge-displacement $x_g$ represents the distance by which the length of the airgap 71 is reduced, between the armature 36 and the top E-shaped core 34, and the distance by which the airgap 72 is increased, between the armature 36 and the bottom E-shaped core 35 of the reluctance-gauge 33. Since the airgap 71 or 72, as the case may be, represents substantially the entire reluctance of the respective flux-paths including the cores 34 and 35, respectively, this means that the two reluctances are varied in opposite directions, one increased and the other decreased, in linear response to the gas-purity-ratio $V_h/V_m$.

The changes in the reluctances of the magnetic flux-paths of the upper and lower magnet-cores 34 and 35 is measured by two coils 74 and 75, respectively mounted on the central legs of the two E-shaped cores 34 and 35. These two coils 74 and 75 are connected as two legs of a Wheatstone bridge, the other two legs of which consist of an inductance 76 having a variable or adjustable mid-tap 77. This Wheatstone bridge may be traced from a conductor 78 to the coil 74, a conductor 79, the coil 75, a conductor 80, the tapped inductance 76, and back to the conductor 78.

Constant-voltage alternating current is supplied to the conductors 78 and 80 of the bridge from a single-phase line 81, through a voltage-regulator 82 which holds the voltage constant, and a variable transformer 82', which can be utilized for meter-reading adjustments, as will be subsequently described. The current produced by any unbalance of the respective arms of the bridge is measured by a milliammeter 83, connected between the mid-tap 77 and the conductor 79. Since the reluctance-variation of the magnetic paths of the coils 74 and 75 is responsive to the gas-purity-ratio $V_h/V_m$, the milliammeter-scale 85 may be calibrated directly in the percentage of hydrogen-content in the mixture of hydrogen and oxygen, as shown by the lower scale, or it may be calibrated in gas-density in any scale that may be desired.

In operation, the compensating bellows 55 compensates for the gas-pressure P and the gas-temperature T. In order that this compensation may be perfect, (or substantially perfect), it is necessary that the length $l$ of the short bell-crank-arm shall be properly chosen, as by loosening the attachment-screw 58 and sliding the same in the slot 57 in the bellows-arm 56, and then re-tightening the screw 58, this being intended as symbolic of any suitable adjustment-means for adjusting the effective length $l$. This adjustment should be such that a change in the gas-pressure P does not cause any variation in the meter-indication, within the operating-range of the instrument. This adjustment will usually be made at the factory, or, if manufacturing-tolerances are adequately controlled, the distance $l$ may be predetermined without the need for adjustment.

The zero-reading 86 of the instrument may be adjusted by stopping the blower-motor 25, and adjusting the mid-tap 77 until the meter 83 reads zero.

On the particular meter 83 shown in Fig. 1, the lower meter-scale is calibrated in percentage of hydrogen-content of a mixture of hydrogen and air. The first mark after zero is for pure hydrogen, or 100% hydrogen, then 90, then 80, and finally 70% hydrogen, which is as far as the meter needs to go, as the mixture becomes explosive after that.

For convenience in the making of calibration-adjustments by the user of the instrument, the meter-scale 85, as shown in Fig. 1, is provided with an upper scale, having two marks on it, in the top half of the scale 85. One upper mark is for pure carbon dioxide, as indicated at $CO_2$, and the other is for air, as indicated by AIR. The $CO_2$ marking is so chosen that it is coincident with the 70% hydrogen mark, although any other $CO_2$ scale could have been chosen. Then the AIR mark will be at some intermediate point, as indicated.

In order that the meter 83 may have two scales, an upper scale for either air or carbon dioxide, and a lower scale for hydrogen, we provide means for changing the spring-constant of the piston-spring 14. We have shown this very diagrammatically in the form of a stop-screw 90 (Fig. 1), which may be set up so as to engage the piston-spring 14, thus changing the effective length of the spring, and hence the spring-setting, so that it will exert a stronger spring-force for resisting the greater gas-pressures produced when the pump 24 is operating in either air or carbon dioxide. When the pump is operating in hydrogen, or in hydrogen-air mixtures of 70% to 100% hydrogen, the stop-screw 90 is screwed back until it clears the piston-spring 14 at all times.

The vertical height or the exact position of the tap for the set-screw 90 is adjusted (or predetermined) at the factory, so that, if the variable transformer 82' is adjusted so that the meter 83 reads exactly at the mark AIR when the instrument is operating in air, and with the stop-screw 90 set up, the instrument will be correctly calibrated for hydrogen and hydrogen-air mixtures with the stop-screw set back out of possible contact with the piston-spring 14. Or the adjustment may be made with carbon-dioxide instead of air, using the CO2 mark and the same set-up position of the stop-screw 90.

Or the correct calibration may be assured by so adjusting the transformer 82' or the voltage-regulator 82 as to maintain a prescribed 60-cycle voltage across the conductors 78 and 80.

Our invention provides a means for obtaining a gas-density indication at a remote point. The meter 83, and the adjustable elements 76, 82 and 82', may be placed as far away, as may be desired, from the gauge-casing 6 or the hydrogen-filled device 5, by the simple expedient of making the three gauge-wires 78, 79, 80 as long as may be necessary.

Our utilization of a reluctance-gauge 33 for measuring the displacements of a piston 9, and means for subjecting the piston to a gas-pressure developed by a blower 24 operating in the gas to be measured, provides a means for converting variable gas-pressures into variable electric currents, which can readily be measured at a distance.

Our addition of the compensating-bellows 55 provides a means for automatically compensating for, or eliminating the response to, either the gas-pressure or the temperature of the test-gas, so that a direct indication may be had of the composition or density of the gas, or its percentage of purity if it is mixed with a diluting or contaminating gas.

While we have somewhat diagrammatically indicated our invention in a single preferred form of embodiment, we are not limited to the precise form, or to all of the features shown. The invention may also be used with other features or with refinements which are not shown. We desire, therefore, that the appended claims shall be accorded the broadest construction consistent with their language.

We claim as our invention:

1. An instrument for responding to a density-characteristic of a gas, comprising means for providing a chamber containing the gas to be responded to, pressure-creating means, in communication with said chamber, for creating a pressure-difference which is responsive to a density-characteristic of the gas in question, displacement-producing means which is responsive to said pressure-difference, movable-element displacement-responsive means for obtaining the desired response to the desired density-characteristic of the gas in question, and connecting-means, including a variable-length arm or causing the displacement-responsive means to be actuated in response to the displacement produced by said displacement-producing means, said variable-length arm comprising an expansible and contractable hollow gas-tight means disposed within said chamber and constituting a gas-responsive adjustment-device which is inversely responsive to only a part of the density-characteristic to which the pressure-creating means responds.

2. An instrument for responding to the density of a gas, comprising means for providing a chamber containing the gas to be responded to, a movable-element pressure-gauge including a movable boundary-wall of said chamber for providing a displacement which is responsive to the pressure-difference on opposite sides of said movable boundary-wall, a movable-element displacement-responsive device disposed within said chamber, movement-communicating means, within said chamber, constituting a variable-length arm, for communicating the pressure-gauge displacement of said movable boundary-wall to the displacement-responsive device, said movement-communicating means including a gas-filled, gas-tight, hermetically sealed expansible and contractable hollow body disposed within said chamber for controlling the length of said arm, said hollow body containing a fixed quantity of entrapped gas which is thus subjected to the temperature and the pressure of the gas to be responded to, and a blower-means having an inlet in communication with said chamber and having an outlet in communication with a space outside of said movable boundary-wall of said pressure-gauge, thus creating the pressure-difference which is effective on opposite sides of the pressure-gauge.

3. An instrument for responding to the density of a gas, comprising means for providing a chamber containing the gas to be responded to, a movable-element pressure-gauge including a movable boundary-wall of said chamber for providing a displacement which is responsive to the pressure-difference on opposite sides of said movable boundary-wall, a movable-element displacement-responsive device disposed within said chamber, movement-communicating means, constituting a variable-length arm, within said chamber, for communicating the pressure-gauge displacement of said movable boundary-wall to the displacement-responsive device, said movement-communicating means including a barometric means which is disposed within said chamber and which responds directly to the absolute temperature of the gas to be responded to, and indirectly to the absolute pressure of said gas, said barometric means being operative to control the effective length of said arm, and a blower-means having an inlet in communication with said chamber and having an outlet in communication with a space outside of said movable boundary-wall of said pressure-gauge, thus creating the pressure-difference which is effective on opposite sides of the pressure-gauge.

4. An instrument for measuring the density of a test-gas, with automatic compensation for both the gas-pressure and the temperature of the test-gas, comprising a movable-element displacement-responsive meter, calibrated in terms of the gas-density to be measured, a movable-element pressure-responsive means for producing a displacement which is responsive to a difference in gaseous pressures, movement-communicating means for causing the displacement of said meter to be responsive to the displacement of said pressure-responsive means, said movement-communicating means comprising a gas-responsive adjustment-device for causing the ratio of the meter-displacement and the pressure-responsive displacement to vary directly in response to the absolute temperature of the test-gas and inversely in response to the absolute pressure of the test-gas, substantially independently of the density of the test-gas, pressure-creating means for creating a pressure-difference which is responsive to a density-characteristic of the test-gas and which is directly responsive to the absolute pressure of the test-gas and inversely responsive to the absolute temperature of the test-gas, and gas-pressure-communicating means for causing the difference in gaseous pressures in said pressure-responsive means to be responsive to the pressure-difference created by said pressure-creating means.

5. The invention as defined in claim 4, characterized by said meter having a second calibration in terms of the gas-density of some known gas, adjustment means for adjusting the setting of the meter-readings, and scale-changing means for making a predetermined change in the response of said pressure-responsive means to the density-characteristic of the test-gas, whereby the meter-readings for both scales are correlated.

HARRY E. CRINER.
RENÉ A. BAUDRY.

REFERENCES CITED

The following references are of record in the file of this patent:

UNITED STATES PATENTS

| Number | Name | Date |
|---|---|---|
| 1,725,554 | Winton | Aug. 20, 1929 |
| 2,000,308 | Von Schutz | May 7, 1935 |
| 2,027,875 | Odend'hal | Jan. 14, 1936 |
| 2,042,374 | Wunsch | May 26, 1935 |
| 2,082,539 | Fisher | June 1, 1937 |
| 2,197,370 | Sullivan | Apr. 16, 1940 |
| 2,211,627 | Morgan et al. | Aug. 13, 1940 |
| 2,223,705 | Roudnicky | Dec. 3, 1940 |
| 2,260,837 | Kuehni | Oct. 28, 1941 |
| 2,265,045 | Pfeiffer | Dec. 2, 1941 |
| 2,318,153 | Gilson | May 4, 1943 |
| 2,404,993 | Sullivan | July 30, 1946 |

FOREIGN PATENTS

| Number | Country | Date |
|---|---|---|
| 15,737 | Great Britain | 1912 |
| 120,440 | Great Britain | Nov. 7, 1917 |
| 57,963 | Norway | May 10, 1937 |